United States Patent
Lovitt et al.

(10) Patent No.: US 11,943,601 B2
(45) Date of Patent: Mar. 26, 2024

(54) AUDIO BEAM STEERING, TRACKING AND AUDIO EFFECTS FOR AR/VR APPLICATIONS

(71) Applicant: Meta Platforms Technologies, LLC, Menlo Park, CA (US)

(72) Inventors: Andrew Lovitt, Redmond, WA (US); Scott Phillip Selfon, Kirkland, WA (US); Taher Shahbazi Mirzahasanloo, Bothell, WA (US); Sean Allyn Coffin, San Anselmo, CA (US); Nava K Balsam, Woodinville, WA (US); Syavosh Zadissa, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/827,414

(22) Filed: May 27, 2022

(65) Prior Publication Data
US 2023/0050966 A1    Feb. 16, 2023

Related U.S. Application Data

(60) Provisional application No. 63/297,597, filed on Jan. 7, 2022, provisional application No. 63/233,143, filed on Aug. 13, 2021.

(51) Int. Cl.
*H04S 7/00*        (2006.01)
*H04R 5/033*     (2006.01)
(Continued)

(52) U.S. Cl.
CPC ............. *H04S 7/302* (2013.01); *H04R 5/033* (2013.01); *H04R 5/04* (2013.01); *H04S 1/007* (2013.01)

(58) Field of Classification Search
None
See application file for complete search history.

(56) References Cited

U.S. PATENT DOCUMENTS 10,841,693 B1    11/2020   Ganeshkumar et al.
2012/0278070 A1   11/2012   Herve et al.
(Continued)

FOREIGN PATENT DOCUMENTS

EP         2824663 A2    1/2015
EP         3343348 A1    7/2018

OTHER PUBLICATIONS

EPO—International Search report and Written Opinion for International Application No. PCT/US2022/040277, dated Dec. 2, 2022, 11 pages.
(Continued)

*Primary Examiner* — Paul W Huber
(74) *Attorney, Agent, or Firm* — McDermott Will & Emery LLP

(57) ABSTRACT

A method for audio beam steering, tracking, and audio effects for an immersive reality application is provided. The method includes receiving, from an immersive reality application, a first audio waveform from a first acoustic source to provide to a user of a headset, identifying a perceived direction for the first acoustic source relative to the headset based on a location of the first acoustic source, and providing, to a first speaker in a client device, an audio signal including the first audio waveform, wherein the audio signal includes a time delay and an amplitude of the first audio waveform based on the perceived direction. A non-transitory, computer-readable medium storing instructions which, when executed by a processor, cause a system to perform the above method, and the system, are also provided.

20 Claims, 12 Drawing Sheets

(51) Int. Cl.
*H04R 5/04* (2006.01)
*H04S 1/00* (2006.01)

(56) References Cited

U.S. PATENT DOCUMENTS

| | | |
|---|---|---|
| 2016/0205488 A1 | 7/2016 | Gomez |
| 2017/0098453 A1 | 4/2017 | Wright et al. |
| 2017/0295446 A1 | 10/2017 | Thagadur Shivappa |
| 2018/0217806 A1 | 8/2018 | Jang |
| 2018/0341455 A1 | 11/2018 | Ivanov et al. |
| 2019/0187779 A1 | 6/2019 | Miller |
| 2019/0320282 A1 | 10/2019 | Moeller |
| 2019/0342693 A1 | 11/2019 | Norris et al. |
| 2020/0059717 A1 | 2/2020 | Chang et al. |
| 2021/0043167 A1 | 2/2021 | Cartier et al. |
| 2021/0092232 A1* | 3/2021 | Norris ............ H04S 7/305 |
| 2021/0104222 A1 | 4/2021 | Laroche et al. |
| 2021/0173614 A1 | 6/2021 | Shin et al. |
| 2021/0295849 A1 | 9/2021 | Van Der Ven et al. |
| 2022/0217490 A1* | 7/2022 | Lyren ............ G10L 15/04 |
| 2022/0238091 A1 | 7/2022 | Jasleen et al. |
| 2022/0417687 A1* | 12/2022 | Lyren ............ G10L 19/22 |

OTHER PUBLICATIONS

EPO—International Search report and Written Opinion for International Application No. PCT/US2022/040281, dated Nov. 22, 2022, 14 pages.
EPO—Invitation to Pay Additional Fees for International Application No. PCT/US2022/040283, dated Dec. 7, 2022, 14 pages.
Shang J., et al., "Enabling Secure Voice Input on Augmented Reality Headsets using Internal Body Voice," 16th Annual IEEE International Conference on Sensing, Communication, and Networking (SECON), 2019, pp. 1-9.
Turan M.A. T., et al., "Source and Filter Estimation for Throat-Microphone Speech Enhancement," IEEE/ACM Transactions on Audio, Speech, and Language Processing, vol. 24, No. 2, Feb. 2016, pp. 265-275.
USPTO—Office Action dated Dec. 7, 2023 for related U.S. Appl. No. 17/824,321, pp. 14 pgs.

* cited by examiner

AUDIO BEAM STEERING, TRACKING AND AUDIO EFFECTS FOR AR/VR APPLICATIONS

CROSS-REFERENCE TO RELATED APPLICATIONS

The present disclosure is related and claims priority under 35 U.S.C. § 119(e) to U.S. Provisional patent application Ser. No. 63/233,143 entitled AUDIO HARDWARE AND SOFTWARE FOR SMART GLASSES, filed on Aug. 13, 2021, and to U.S. Provisional patent application Ser. No. 63/297,597, entitled AUDIO BEAM STEERING, TRACKING AND AUDIO EFFECTS FOR AR/VR APPLICATIONS, filed on Jan. 7, 2022, both to Andrew LOVITT et al., the contents of which applications are hereinafter incorporated by reference, in their entirety, for all purposes.

BACKGROUND

Field

The present disclosure is directed to handling sound input and output in wearable headsets. More specifically, embodiments as disclosed herein are directed to handling multiple microphone inputs and speaker outputs in smart glasses for use in immersive reality environments.

Related Art

In the field of wearable headsets, sound effects that provide real-time immersive experiences are often neglected due to the challenging implementation of multiple sensing devices, data processing, and three-dimensional calculation and rendition of multiple acoustic sources. Accordingly, the lack of accurate and realistic sound effects substantially detracts from the immersive feeling to the users.

BRIEF DESCRIPTION OF THE DRAWINGS

In the figures, elements and procedures having the same or similar reference elements have the same or similar attributes and description, unless explicitly stated otherwise.

SUMMARY

Figure 1:
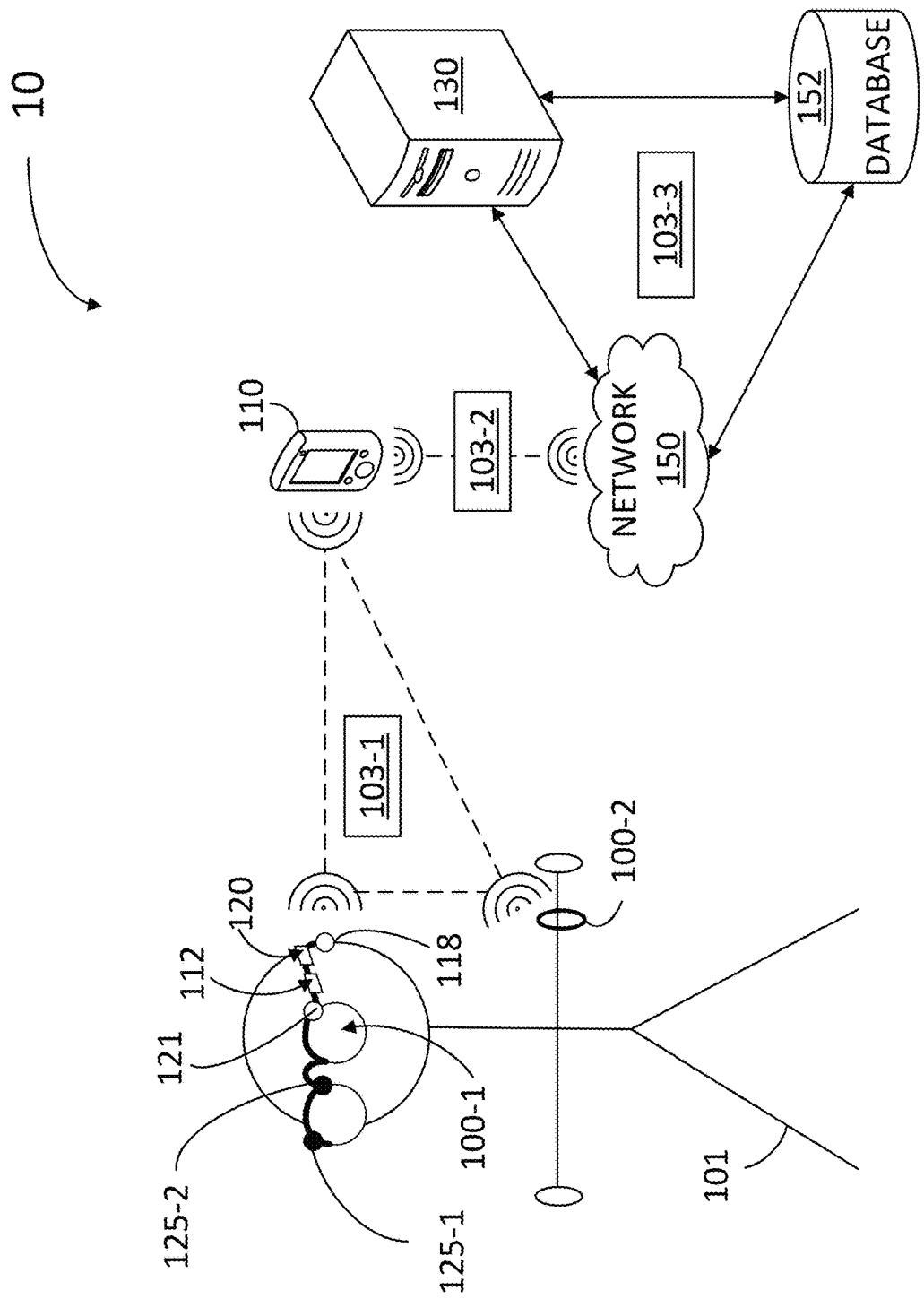
FIG. 1 illustrates an architecture including one or more wearable devices coupled to one another, to a mobile device, a remote server and to a database, according to some embodiments.

In a first embodiment, a computer-implemented method includes receiving, from an immersive reality application, a first audio waveform from a first acoustic source to provide to a user of a headset. The computer-implemented method also includes identifying a direction of the first acoustic source relative to the headset based on a location of the first acoustic source; and providing, to a first speaker in a client device, an audio signal including the first audio waveform, wherein the audio signal includes a time delay and an amplitude of the first audio waveform based on the direction of the first audio source.

In a second embodiment, a headset includes a processor configured to receive, from an immersive reality application, a first audio waveform from a first acoustic source in a first location. The headset also includes a left speaker, configured to provide the first audio waveform to a left ear of a headset user, and a right speaker, configured to provide the first audio waveform to a right ear of the headset user, wherein the processor is configured to adjust a time delay of the first audio waveform between the left speaker and the right speaker, and to modulate an amplitude of the first audio waveform in the left speaker and the right speaker based on the first location of the first acoustic source.

In a third embodiment, a computer-implemented method includes generating, in a server, a first audio waveform from a first acoustic source in an immersive reality application installed in the server. The computer-implemented method includes generating an environmental datum that places the first acoustic source within a virtual world, based on the immersive reality application, determining a perceived direction for the first audio waveform, based on the environmental datum, and providing an acoustic signal with the first audio waveform including a delay and an amplitude of the first audio waveform based on the perceived direction, to one or more speakers in a client device that is communicatively coupled with the server.

In another embodiment, a system includes a memory storing instructions and a processor to execute the instructions to cause the system to perform a method. The method includes receiving, from an immersive reality application, a first audio waveform from a first acoustic source to provide to a user of a headset, identifying a direction for the first acoustic source relative to the headset based on a location of the first acoustic source, and providing, to a first speaker in a client device, an audio signal including the first audio waveform, wherein the audio signal includes a time delay and an amplitude of the first audio waveform based on the direction for the first acoustic source.

In yet another embodiment, a system includes a first means to store instructions, and a second means to execute the instructions to cause the system to perform a method. The method includes receiving, from an immersive reality application, a first audio waveform from a first acoustic source to provide to a user of a headset, identifying a direction for the first acoustic source relative to the headset based on a location of the first acoustic source, and providing, to a first speaker in a client device, an audio signal including the first audio waveform, wherein the audio signal includes a time delay and an amplitude of the first audio waveform based on the direction for the first acoustic source.

DETAILED DESCRIPTION

In the following detailed description, numerous specific details are set forth to provide a full understanding of the present disclosure. It will be apparent, however, to one ordinarily skilled in the art, that embodiments of the present disclosure may be practiced without some of these specific details. In other instances, well-known structures and techniques have not been shown in detail so as not to obscure the disclosure.

Audio is a primary interaction modality for enhanced reality applications, including virtual reality (VR) and augmented reality (AR). As part of this, spatial audio can play an important role in allowing for hardware/software-based audio filters, giving users access to novel audio experiences, providing better and more immersive user content creation.

Wearable devices as disclosed herein include multiple acoustic and contact microphones combined with at least two speakers intended to present an audio signal to a user (one for each of the ears of a user or for each of two speakers in a binaural sound system) configured to provide a perceived audio signal for a user in an immersive reality application. The perceived audio signal may include multiple acoustic effects including doppler frequency shifts and spatial amplitude modulation for moving acoustic sources, and placement of one or more participants in the immersive reality application in different locations of a virtual world.

In some embodiments, a server may collect signals from multiple users of smart glasses and combine the signals in a virtual reality for a podcast, using an immersive reality application as disclosed herein. The podcast may include sound effects placing each of the participants in different locations within the virtual reality.

Embodiments as disclosed herein include placing one or more moving sound sources in the virtual reality, and adding the corresponding sound effects to a broadcast of the virtual reality. Accordingly, embodiments as disclosed herein provide the ability to send metadata with streams to influence the rendering of an audio stream, the ability for the user to select and move between different filters for the user, and the ability of the device to interpret the 'filter' application and apply user settings to the content.

Being able to augment a user's video is highly desirable for immersive reality applications. With the inclusion of spatial audio into significantly more devices, there is a wide range of possible spatial audio 'filters' that can be applied to make the immersive applications highly appealing to users.

In some embodiments, a remote server sends to a recipient device (e.g., a smart glass or other headset device), information about an audio filter to allow the device to provide an acoustic rendition of the user's choice. This could be done via any mix of networked devices and systems, including a mobile device tied to the user and paired with the smart glass.

Possible filters include such concepts as: basic positional information (two people speaking to the right and left of the listener respectively), animated positions ('make my voice walk around the person's head'), wherein speed is adjustable, make a user's and/or a caller's voice appear to jump up and down; make the user or caller seem (acoustically) to go far away and come up real close to the device, and more. These filters can then be applied and allowed to run during both a live audio interaction (VoIP) or offline (podcast, render of a voicemail recording, and the like) to enhance the immersive experience for the user.

Additionally, immersive experiences can be further augmented by the user's settings and personalized data, such as applying their own spatial audio adjustments for HRTFs or device settings. Maintaining these as descriptive metadata also allows users to disable such effects if they are either distracting or impede accessibility. In some embodiments, the filters can apply spatial audio such as room acoustic effect (could be from the real-life room wherein the user is located, or a 'virtual' environment, or from other premade set), voice changes (doppler, reverb wet/dry mix), or additional audio effects.

FIG. 1 illustrates an architecture 10 including one or more wearable devices 100-1 and 100-2 (hereinafter, collectively referred to as "wearable devices 100") with a user 101, coupled to one another, to a mobile device 110, a remote server 130 and to a database 152, according to some embodiments. Wearable devices 100 may include a smart glass or augmented reality headset 100-1 and a wrist-band (100-2 or "watch"), and mobile device 110 may be a smart phone, all of which may communicate with one another via wireless communications and exchange a first dataset 103-1. In some embodiments, mobile device 110 may belong to user 101 as well. Dataset 103-1 may include a recorded video, audio, or some other file or streaming media. The user of wearable devices 100 is also the owner or is associated with mobile device 110.

Mobile device 110 may be communicatively coupled with remote server 130 and database 152 via a network 150, and transmit/share information, files, and the like with one another (e.g., dataset 103-2 and dataset 103-3).

In some embodiments, smart glass 100-1 may include multiple sensors 121 such as inertial measurement units (IMUs), gyroscopes, microphones, cameras, and the like mounted within the frame of AR headset 100-1 or wrist-watch 100-2 or wrist-band. Other sensors 121 that can be included in wearable devices 100 (e.g., smart glasses 100-1, wrist-bands 100-2, and the like) may be magnetometers, microphones, photodiodes and cameras, touch sensors and other electromagnetic devices such as capacitive sensors, a pressure sensor, and the like. Smart glass 100-1 may include an acoustic microphone 125-1 and a contact microphone 125-2 (hereinafter, collectively referred to as "microphones 125"). Acoustic microphone 125-1 receives acoustic signals propagating through the air, as pressure waves. Contact microphone 125-2 may be mechanically coupled to the skin and a bone of the user, e.g., in a nose pad or in an arm of smart glass 100-1, in contact with the user's temple, and the like.

In addition, smart glass 100-1 or any other wearable device 100, or mobile device 110 may include a memory circuit 120 storing instructions, and a processor circuit 112 configured to execute the instructions to cause smart glass 100-1 to perform, at least partially, some of the steps in methods consistent with the present disclosure. In some embodiments, smart glass 100-1, wrist-watch 100-2, wrist-band, or wearable device 100, mobile device 110, server 130, and/or database 152 may further include a communications module 118 enabling the device to wirelessly communicate with remote server 130 via network 150. In some embodiments, communications module 118 can include, for example, radio-frequency hardware (e.g., antennas, filters analog to digital converters, and the like) and software (e.g., signal processing software). Smart glass 100-1 may thus download a multimedia online content (e.g., dataset 103-1) from remote server 130, to perform at least partially some of the operations in methods as disclosed herein. Network 150 may include, for example, any one or more of a local area network (LAN), a wide area network (WAN), the Internet, and the like. Further, the network can include, but is not limited to, any one or more of the following network topologies, including a bus network, a star network, a ring network, a mesh network, a star-bus network, tree or hierarchical network, and the like.

Figure 2:
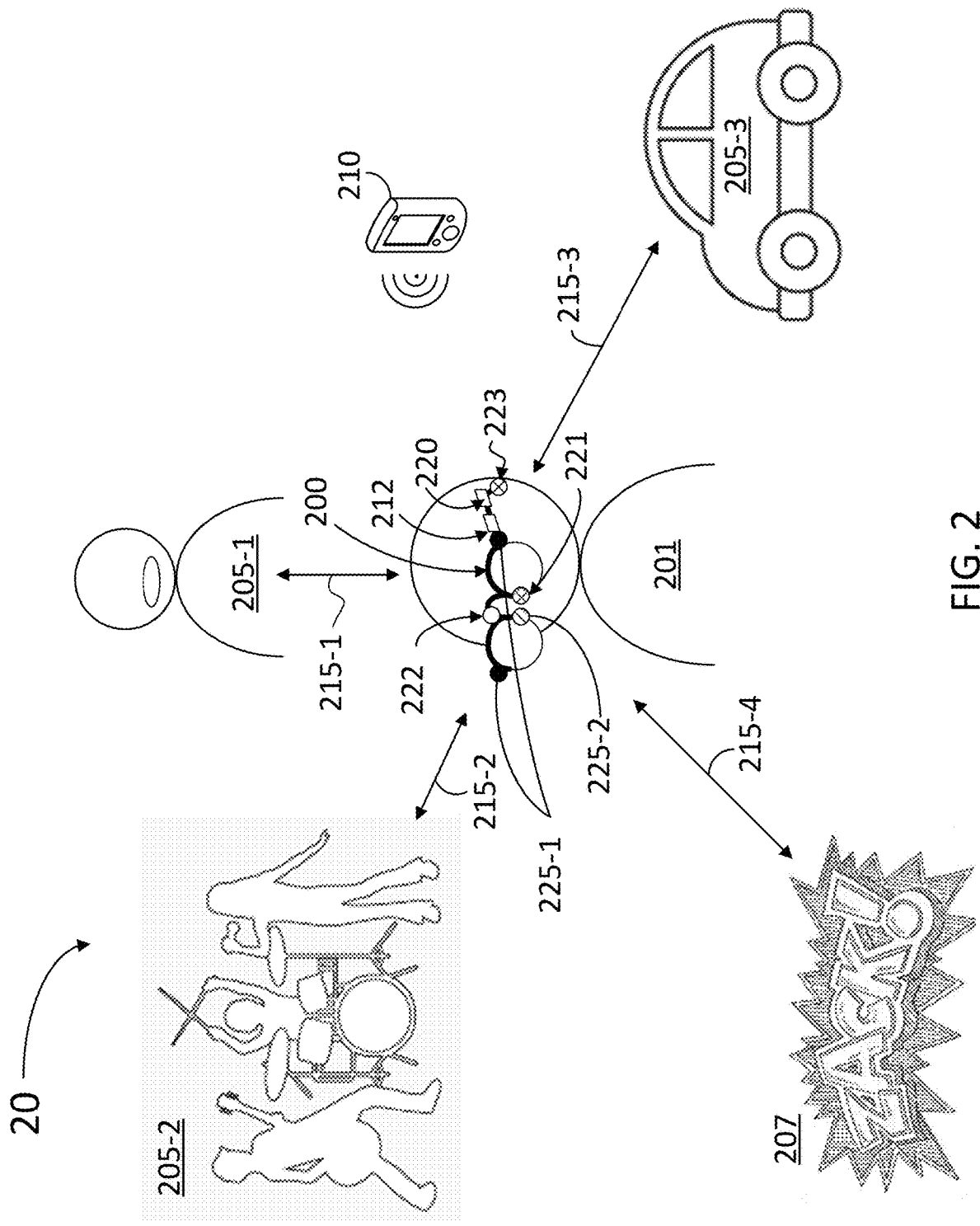
FIG. 2 illustrates a smart glass in an environment including multiple acoustic and noise sources, according to some embodiments.

FIG. 2 illustrates a smart glass 200 in an environment 20 including multiple acoustic sources 205-1, 205-2, and 205-3 (hereinafter, collectively referred to as "acoustic sources 205") and noise (e.g., background interference) 207, according to some embodiments. Smart glass 200 may belong to a user 201 and may communicate wirelessly with a mobile device 210 also with user 201. Smart glass 200 includes a camera 222, one or more acoustic microphones 225-1, contact microphone 225-2 (hereinafter, collectively referred to as "microphones 225"), an inertial motion unit (IMU) sensor or gyroscope 221, and at least one speaker 223, mounted on the frame (e.g., nose pads, arms, rim, and the like) of smart glass 200. Acoustic sources 205 may include a person 205-1 talking to the user of the smart glass, a music band 205-2 playing in the background, and a moving source 205-3 (e.g., a car, train, plane, toy, drone, or a moving person). A noise source 207 may be a background noise, environmental noise, and the like (e.g., kitchen noise in a restaurant, the humming of a motor engine or machine).

Smart glass 200 may also include a memory circuit 220 storing instructions and a processor circuit 212 configured to execute the instructions to perform one or more operations consistent with methods as disclosed herein. For example, by collecting the acoustic signals from each of acoustic sources 205, including noise 207, processor circuit 212 may determine a direction of arrival, DA, 215-1, 215-2, 215-3, and 215-4 (hereinafter, collectively referred to as "DAs 215") for a sound waveform from each of acoustic sources 205 and noise 207, respectively. To do this, processor 212 may also provide a common clock signal to microphones 225, so that the time of arrival at each microphone 225 of the different waveforms from each acoustic source 205 and noise 207 may be registered and stored in memory circuit 220. By determining the different time of arrival of a waveform from each source to microphones 225, the direction of the source relative to smart glass 200 may be established (e.g., DAs 215).

In some embodiments, memory circuit 220 may include an immersive reality application that provides instructions to processor 212 to project a virtual feature onto the display in at least one of the eyepieces of smart glass 200. Accordingly, at least one or more of acoustic sources 205 and noise 207 may be a virtual feature embedded in a display of smart glass 200. Moreover, in some embodiments, at least one or more of acoustic sources 205 and noise 207 may be a virtual feature which, while not displayed in one of the eyepieces of smart glass 200, may still provide acoustic signals to the user via the one or two speakers 223 in smart glass 200, positioned near each of the user's ears.

In addition to determining DAs from different acoustic sources 205 and noise 207, processor circuit 212 may use signals from IMU sensor 221 to determine position, location, and orientation of smart glass 200 relative to the real world (e.g., as defined by gravity). Accordingly, by integrating signals from IMU sensor 221 or communicating with a geolocation system, processor circuit 212 may identify a location for smart glass 200, and a position and location of each of acoustic sources 205 and noise 207. Using this information, processor circuit 212 may further be able to provide and update a virtual DA 215 for a virtual acoustic source, as user 201 moves along and rotates the head (and consequently, the smart glasses as well). Processor 212 then provides speakers 223 on each of the ears of user 201 an appropriate delay and relative intensity consistent with the virtual or updated direction of arrival of the waveform from the virtual source (e.g., stereo sound). Using this information, processor circuit 212 may provide audio beam steering (to provide a virtual sound/noise source in a virtual DA 215 to speakers 223), tracking (to select/enhance/suppress a specific acoustic source 205 at microphones 225), and form other audio effects for immersive reality applications.

Figure 3:
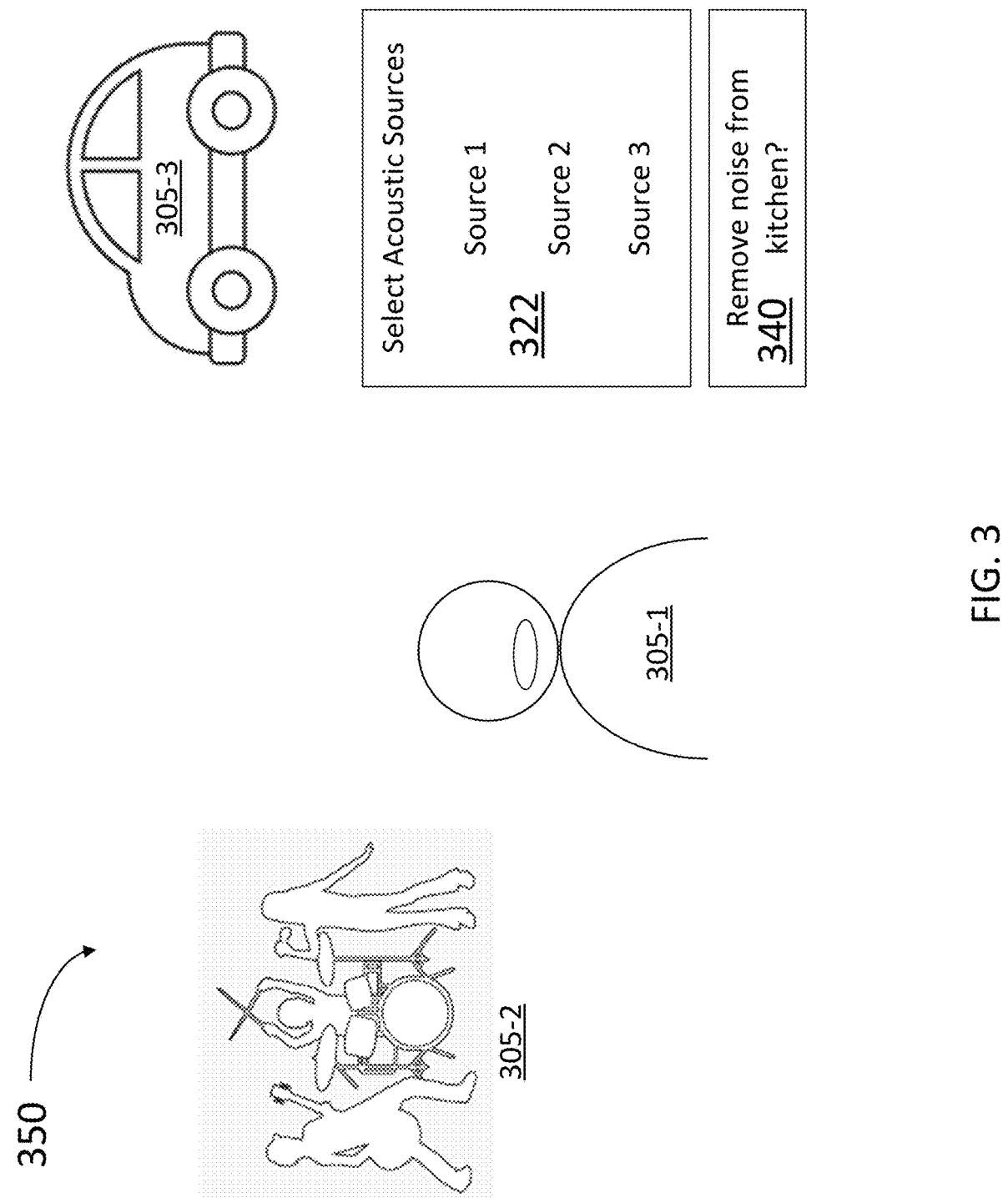
FIG. 3 illustrates a selection of a direction of arrival of an audio source from multiple microphones on a smart glass, according to some embodiments.

FIG. 3 illustrates a menu 322 for a user to choose tracking of a selected acoustic source 305-1, 305-2, and 305-3 (hereinafter, collectively referred to as "acoustic sources 305") in an immersive reality application 350, according to some embodiments. In some embodiments, while the user has the different acoustic sources 305 on display in an eyepiece of a smart glass as disclosed herein, immersive reality application 350 may be running in the smart glass or in a mobile device paired with the smart glass (e.g., mobile devices 110 and 210, and smart glass 100 or 200). Immersive reality application 350 may provide, in real time, a menu 322 for the user to select between multiple acoustic sources 305 at least one that the user desires to track and pay attention to.

When the user selects one or more of acoustic sources 305, the system may be configured to enhance the signal of the microphones in the smart glass (e.g., microphone 125 and 225) based on the time delays and sound wave amplitudes associated to the corresponding DA (e.g., DAs 215). This may be done in real time. In addition, the processor in the smart glass may apply noise cancelation procedures for DAs associated with other acoustic sources 305 or noise (e.g., processors 112 or 212, and noise 207). Moreover, the processor in the smart glass may apply speech transcription and/or enhancement of the selected acoustic source 305.

Moreover, in some embodiments, immersive reality application 350 may detect and identify the noise source (e.g., kitchen noise or a noisy table at a restaurant, a motor engine, or a buzzing or humming sound coming from an engine, person, animal, or other environmental feature) and provide in menu 322 for the user an option 340 to cancel or suppress the noise source.

Figure 4:
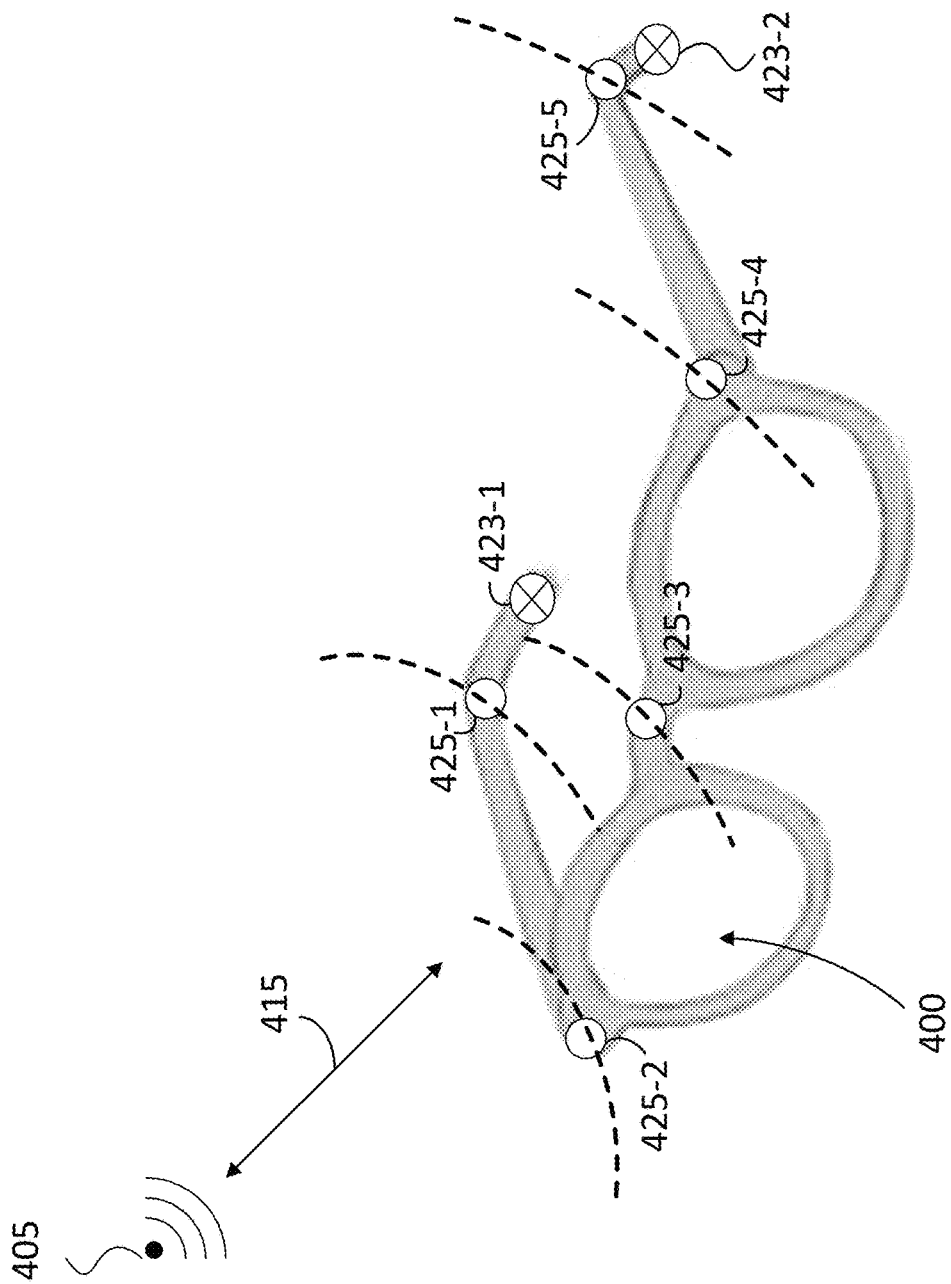
FIG. 4 illustrates a menu for a user to choose tracking of a selected acoustic source in an immersive reality application, according to some embodiments.

FIG. 4 illustrates a selection of a direction of arrival 415 of an audio source 405 from multiple microphones 425-1, 425-2, 425-3, 425-4, and 425-5 (hereinafter, collectively referred to as "audio sources 425") on a smart glass 400, according to some embodiments. Accordingly, DA 415 may be selected based on the difference in time of arrival of a sound waveform to each of spatially distributed microphones 425 on smart glass 400. In some embodiments, it may suffice to know the difference in time of arrival to assess DA 415 as a unit vector having two direction cosines. In some embodiments, the system may be able to determine the specific location of acoustic source 405 relative to smart glass 400 and even relative to geocoordinates.

In some embodiments, the assessment of DA 415 and location of acoustic source 405 may include resolving a linear regression problem associating times of arrival or sound signals to each of microphones 425 based on DA 415 and the speed of sound. To determine the time of arrival, the system may be configured to select a characteristic portion of the waveform generated by acoustic source 405, that may be easily identifiable using digital filters at each microphone 425. In some embodiments, and to enhance accuracy, the entire waveform or a substantive portion of it may be used to match the origin of acoustic source 405. Other filtering techniques using hardware or software may be implemented, to identify distinct acoustic sources 405 involved in any given event. In some embodiments, the software may include non-linear techniques such as non-linear regression, neural networks, machine learning, and artificial intelligence. Accordingly, in some embodiments, the system may include geolocation sensors and devices (e.g., IMU sensors 121 or 221) to better identify location and distances in the user environment at the time of the event recording. Speakers 423-1 and 423-2 may be associated with each of the left and right ears of the user. Accordingly, the processor may provide a delay between speaker 423-1 and speaker 423-2 to an acoustic waveform from acoustic source 405, to provide to the user the impression that the source is located along DA 415 (e.g., stereo sound). In addition to a time delay, the processor may also adjust a frequency of the audio waveform according to a doppler shift in the signal based on the direction of motion, speed, and relative orientation of the smart glass thereof. In some embodiments, the Doppler adjustment may be provided to a virtual acoustic source moving at a virtual speed, in a virtual direction relative to the smart glass.

FIGS. 5A-5D illustrate different environments 50A, 50B, 50C, and 50D (hereinafter, collectively referred to as "environments 50") of spatial audio filter effects for immersive reality applications 550A, 550B, 550C, and 550D (hereinafter, collectively referred to as "IR applications 550") running in smart glasses 500-1 and 500-2 (hereinafter, collectively referred to as "smart glasses 500"), according to some embodiments. Network 150, data set 503-1, and mobile devices 510-1 and 510-2 (hereinafter, collectively referred to as "mobile devices 510") are consistent with the above descriptions of the same, throughout this disclosure. Users 501-1, 501-2, 501D-1 and 501D-2 (hereinafter, collectively referred to as "users 501") are associated with a mobile device 510 and with a smart glass 500, a caller 502, and a sound source 505.

IR applications 550 may include stereo sound provided via speakers 523 in smart glasses 500, wherein users 501 acquire a "persona" or avatar 511-1 and 511-2 (hereinafter, collectively referred to as "avatars 511"), and caller 502 acquires a persona or avatar 512A, 512B, 512C-1, or 512C-2 (hereinafter, collectively referred to as "avatars 512"). Avatars 511 and 512 may be "audio avatars." In some embodiments, smart glasses 500 may include a display in at least one of the eyepieces, such that avatars 511 and 512 provided by IR applications 550 are image representations of users 501 and caller 502. These image representations may be a face, a cartoon, a drawing, or a virtual reality, three-dimensional rendition of a face, head, or the full body including gestures. In that regard, the image representations of avatars 511 and 512 may be displayed in a virtual reality representation on the display. An IMU sensor 521 may provide data to locate and position users 501 in IR applications 550.

Figure 5A:
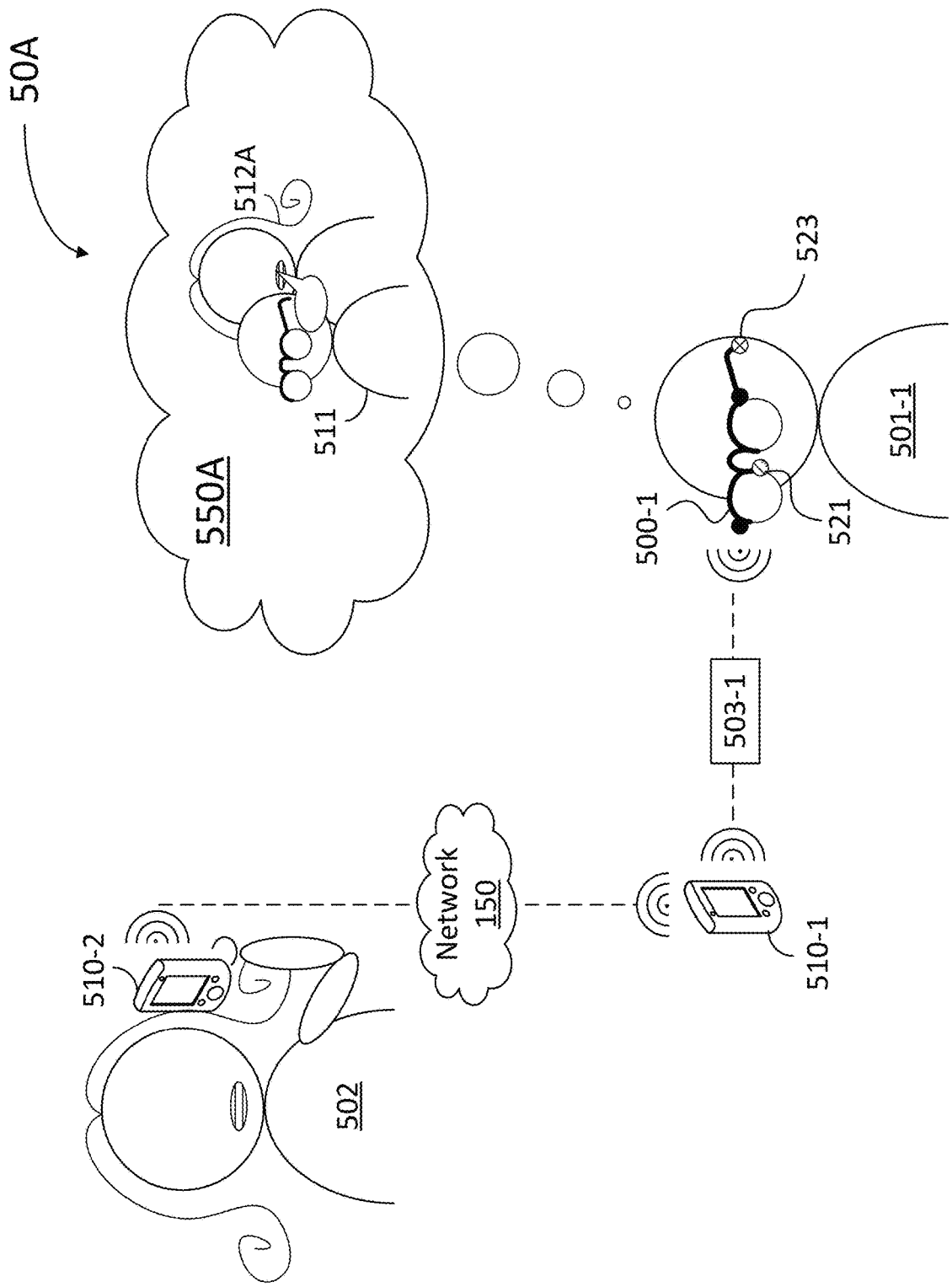
FIGS. 5A-5D illustrate different examples of spatial audio filter effects for immersive reality applications running in smart glasses, according to some embodiments.

FIG. 5A illustrates smart glass user 501-1 and a caller 502 in a live voice over the internet (VoIP) chat, through network 150. In some embodiments, caller 502 may also be using a smart glass (e.g., or an AR/VR headset) to communicate with user (501-1). User 501 may activate a filter in IR application 550A that makes smart glass 500-1 render audio to sound like caller 502 is on the user's shoulder (e.g., avatar 512A on the shoulder of avatar 511). In a similar embodiment, user 501 may select a filter in IR application 550A so that speaker 523 renders a sound such that avatar 512A appears as a magical pixie of caller 502, floating around, including a small twinkle or chirp added to the audio waveform to sound like they are coming from different places, or like caller 502 is jumping around user 501 (e.g., avatar 512A jumping around avatar 511). In some embodiments, the audio filters are world-locked so that the spatial audio uses a three degrees of freedom tracking 521 in smart glass 500-1 to make it sound like their voice is coming from a selected virtual world direction as user 501-1 moves or changes his/her head pose.

Figure 5B:
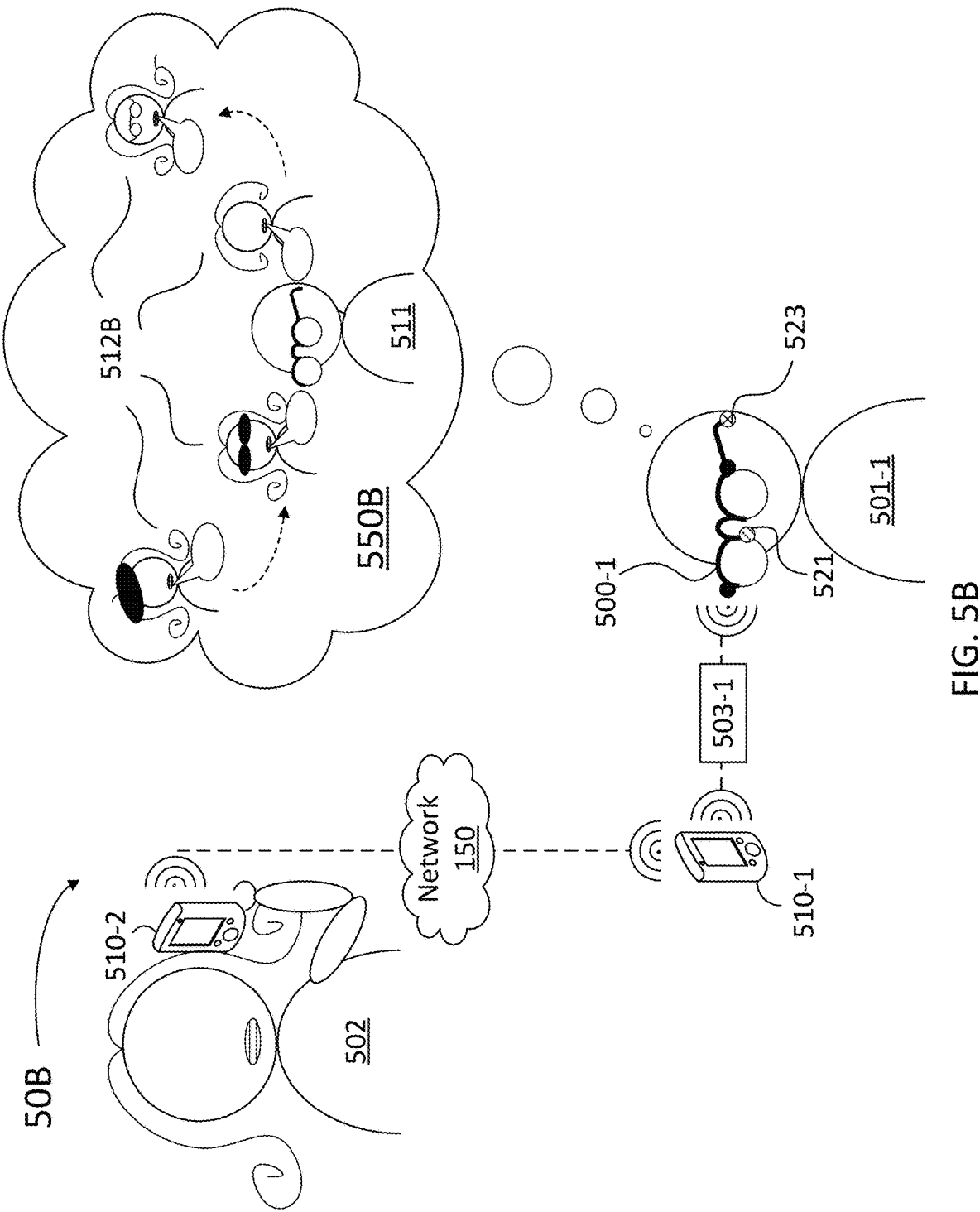

FIG. 5B illustrates an audio filter in IR application 550B, wherein smart glass 500-1 includes an acoustic rendition where caller 502 sounds like avatar 512B is dive bombing avatar 511 by coming from above and getting close then getting further away, relative to avatar 511 for user 501-1. In some embodiments, these sound effects may be applied to a moving caller 502 (e.g., whether the caller is moving in the real world, or in a virtual world).

Figure 5C:
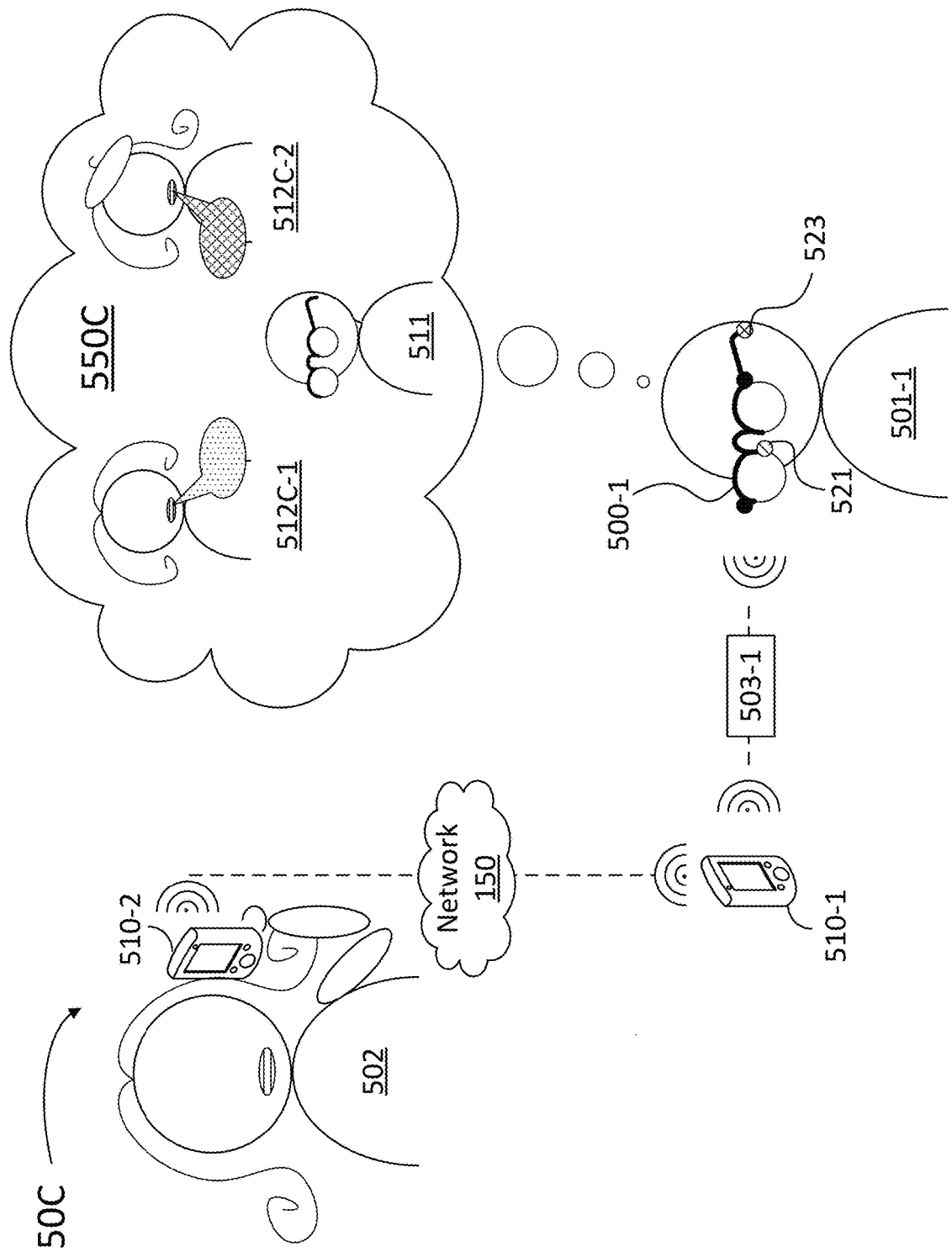

FIG. 5C illustrates an audio filter in IR application 550C, wherein smart glass 500-1 includes an acoustic rendition in which user 501-1 is broadcasting a podcast that includes caller 502. User 501-1 (or caller 502) may start telling a story with two different characters (e.g., character 512C-1 and character 512C-2, hereinafter, collectively referred to as "characters 512C") talking. Characters 512C can toggle so that the voice from character 512C-1 sounds from the right side of user avatar 511 while character 512C-2 sounds from the left user avatar 511.

Figure 5D:
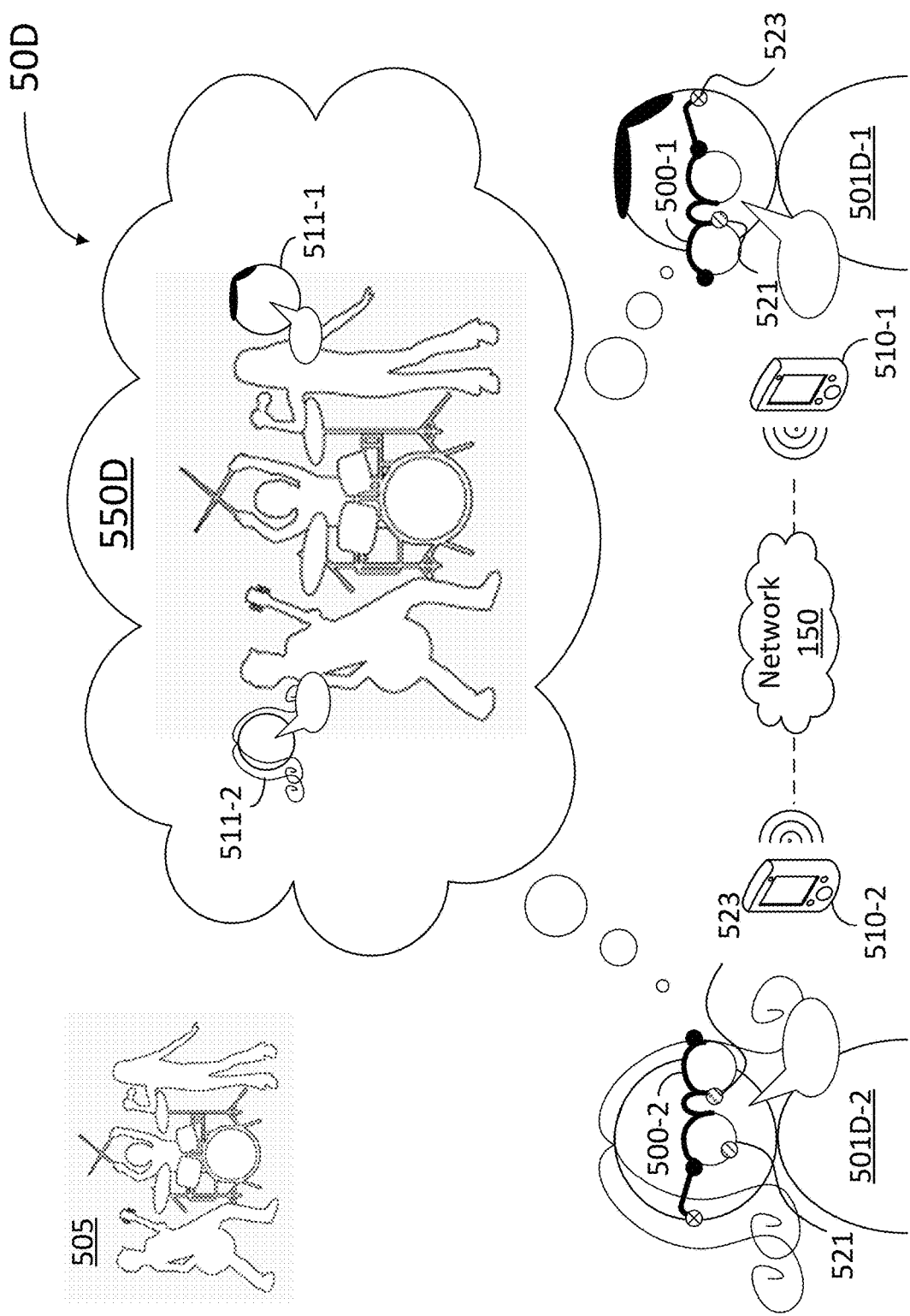

FIG. 5D illustrates users 501D-1 and 501D-2 (hereinafter, collectively referred to as "users 501D") listening to an acoustic source 505 (e.g., a music band) in surround sound or spatial audio format, while wearing smart glasses 500-1 and 500-2 (hereinafter, collectively referred to as "smart glasses 500") as disclosed herein. User 501D-2 can toggle her smart glasses 500-2 such that they are now positioned at the same place where the vocals from the music band are originating from. This creates the immersive effect of acoustically rendering users 501D 'within the band'.

Figure 6:
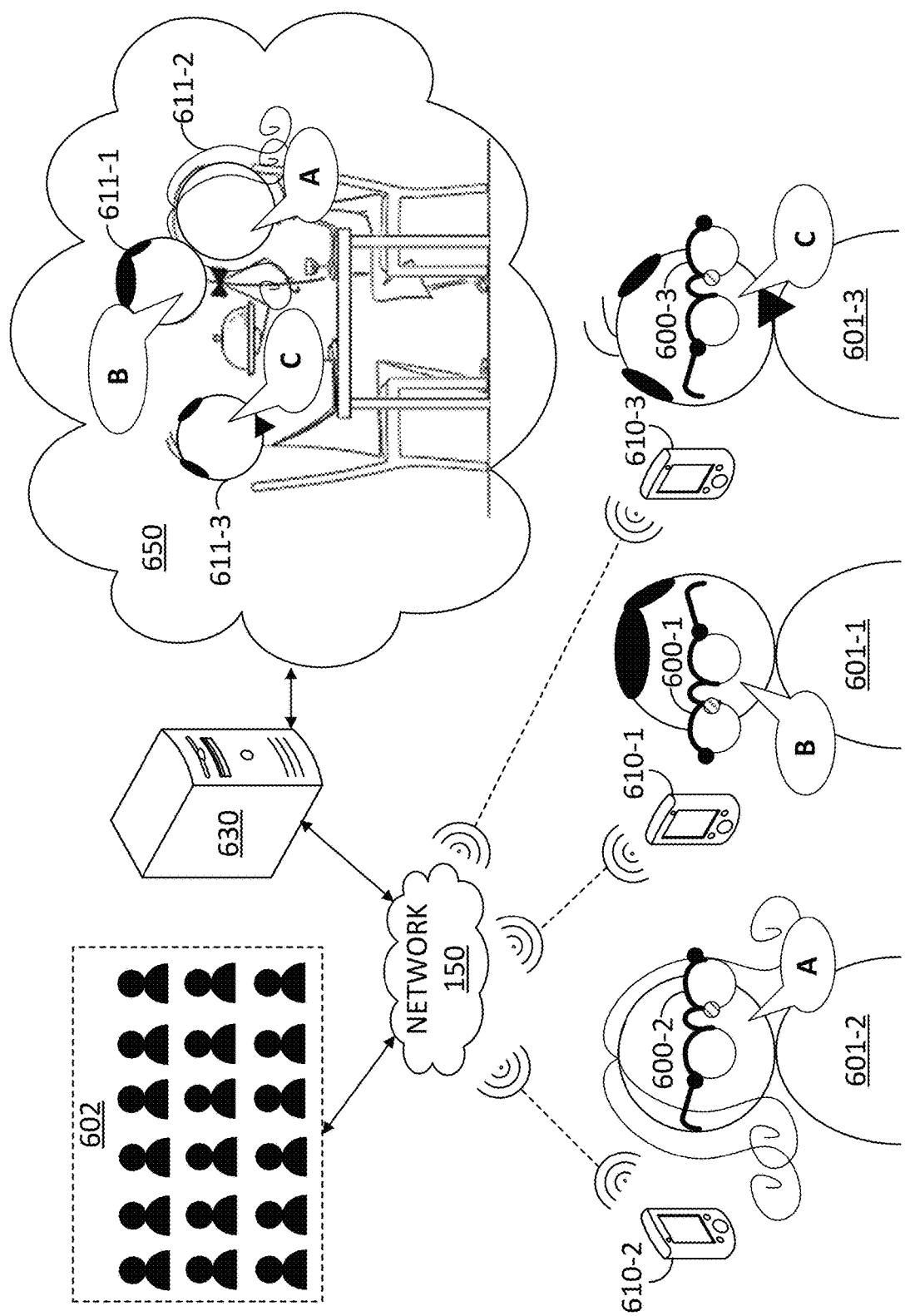
FIG. 6 illustrates spatial audio filtering effects in a smart glass for a podcast application, according to some embodiments.

FIG. 6 illustrates spatial audio filtering effects in smart glasses 600-1, 600-2, and 600-3 (hereinafter, collectively referred to as "smart glasses 600") for a podcast application 650, according to some embodiments. Accordingly, users 601-1, 601-2, and 601-3 (hereinafter, collectively referred to as "users 601") are broadcasting a podcast 650 to an audience 602. Each of users 601 may access podcast application 650 via a mobile device 610-1, 610-2, and 610-3 (hereinafter, collectively referred to as "mobile devices 610").

Each of users 601 is perceptually heard from a different spatial position (say, left, right, and center, around a table, in a restaurant, and the like), making their voices easier to discern and tell apart, and making podcast 650 feel more 'real' rather than everyone being in mono-aural and sounding 'inside my head' (from the perspective of any one in audience 602). In some embodiments, a remote server 630 providing podcast 650 to audience 602 may further provide virtual images showing avatars 611-1, 611-2, and 611-3 (hereinafter, collectively referred to as "avatars 611") for users 601, respectively, in a virtual scene, wherein each of their voices is appropriately placed in a binaural sound system (e.g., assuming that one or more of the podcast audience is wearing a smart glass, or is watching the podcast from a display that includes binaural-stereo-sound system) according to their disposition in the virtual scene. Network 150 and mobile devices 610 are consistent with the above descriptions of the same, throughout this disclosure.

Figure 7:
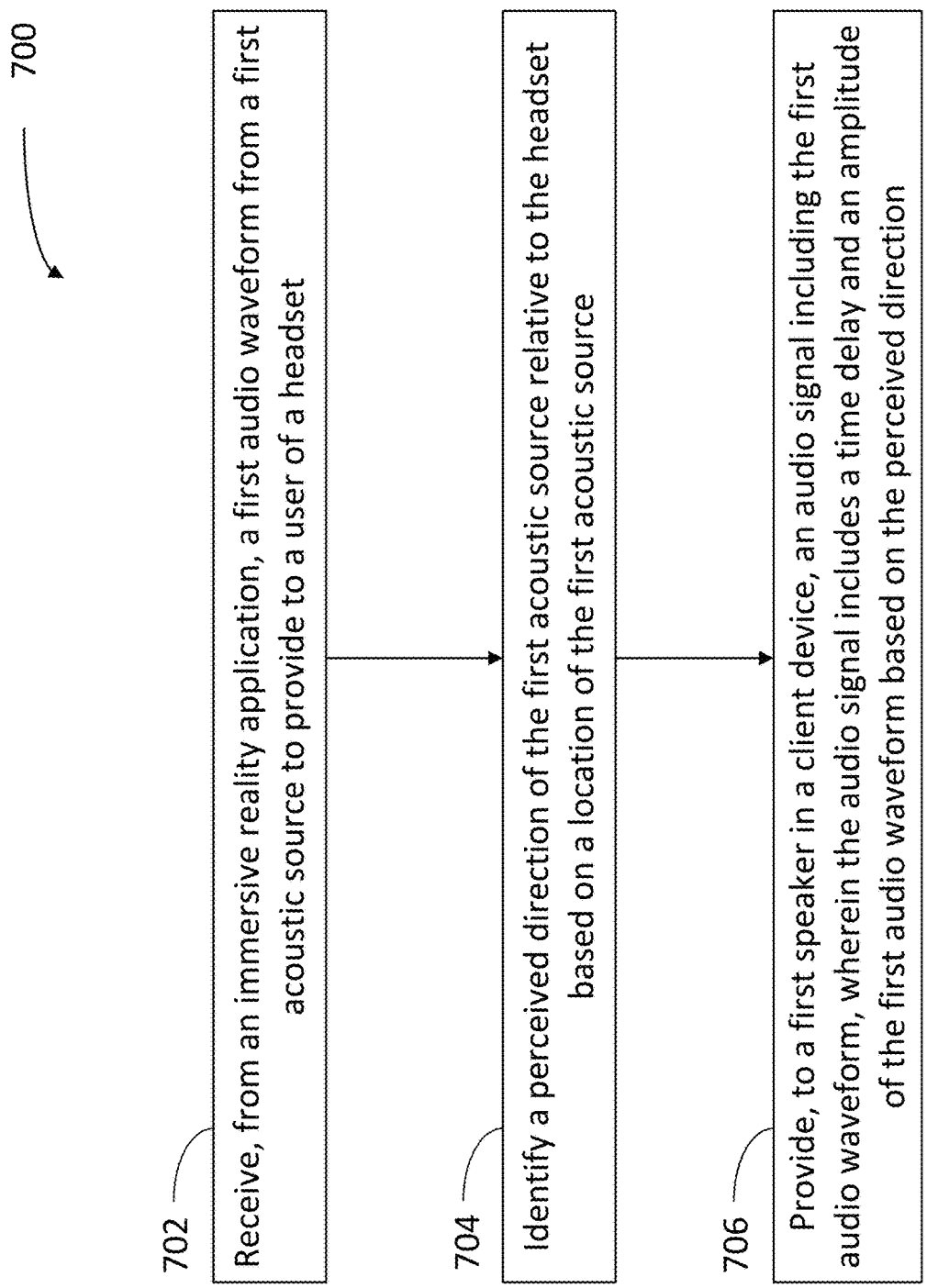
FIG. 7 is a flowchart illustrating steps in a method 700 for audio beam steering, tracking, and audio effects for an immersive reality application, according to some embodiments.

FIG. 7 is a flowchart illustrating steps in a method 700 for audio beam steering, tracking, and audio effects for an immersive reality application, according to some embodiments. In some embodiments, at least one or more of the steps in method 700 may be performed by a processor executing instructions stored in a memory in either one of a smart glass or other wearable device on a user's body part (e.g., head, arm, wrist, leg, ankle, finger, toe, knee, shoulder, chest, back, and the like). In some embodiments, at least one or more of the steps in method 700 may be performed by a processor executing instructions stored in a memory, wherein either the processor or the memory, or both, are part of a mobile device for the user, a remote server, or a database, communicatively coupled with each other via a network (e.g., processor 112, memory 120, mobile device 110, server 130, and network 150). Moreover, the mobile device, the smart glass, and the wearable devices may be communicatively coupled with each other via a wireless communication system and protocol (e.g., communications module 118 including a radio, Wi-Fi, Bluetooth, near-field communication—NFC— and the like). In some embodiments, a method consistent with the present disclosure may include one or more steps from method 700 performed in any order, simultaneously, quasi-simultaneously, or overlapping in time.

Step 702 includes receiving, from an immersive reality application, a first audio waveform from a first acoustic source to provide to a user of a headset. In some embodiments, step 702 includes receiving the location of the first acoustic source from the immersive reality application. In some embodiments, step 702 further includes receiving multiple audio waveforms from multiple acoustic sources, and providing the audio signal to a first speaker in a client device includes inserting each of the audio waveforms with a time delay and an amplitude based on multiple perceived directions associated with a location for each of the acoustic sources provided by the immersive reality application. In some embodiments, the immersive reality application is a podcast and the first acoustic source includes a first participant of the podcast, and step 702 includes providing a second audio signal from the user of the headset as a second participant of the podcast in a second perceived direction indicative of a relative position between the first participant and the second participant, within the podcast.

Step 704 includes identifying a perceived direction of the first acoustic source relative to the headset based on a location of the first acoustic source. The perceived direction may be the incident direction to the headset user in a real or virtual space, which is used to apply spatial audio to create a stereo sound for the headset user. In some embodiments, step 704 further includes receiving, from the immersive reality application, a second audio waveform from a second acoustic source, identifying a second perceived direction for the second acoustic source based on a location of the second acoustic source, and inserting the second audio waveform in the audio signal with a time delay and an amplitude based on the second perceived direction. In some embodiments, the first acoustic source is a caller in communication with the user of the headset, and step 704 includes placing the caller in a selected virtual position relative to the user of the headset. In some embodiments, the immersive reality application includes a capture of an event attended by the user of the headset, the first acoustic source is a second user of a second headset, the first audio waveform is provided by the second headset, and step 704 includes placing the second user in a selected location within the event.

Step 706 includes providing, to a first speaker in a client device, an audio signal including the first audio waveform, wherein the audio signal includes a time delay and an amplitude of the first audio waveform based on the perceived direction. In some embodiments, the client device is the headset, and step 706 includes providing the audio signal to a second speaker in the headset, based on the perceived direction. In some embodiments, the client device is a perceived system including at least two speakers and communicatively coupled to the headset via a network, and step 706 includes providing the audio signal to a second speaker in the perceived system, based on the perceived direction. In some embodiments, the headset includes a display in at least one eyepiece, and step 706 includes providing an image on the display of the first acoustic source for the user of the headset that is consistent with the location of the first acoustic source.

Figure 8:
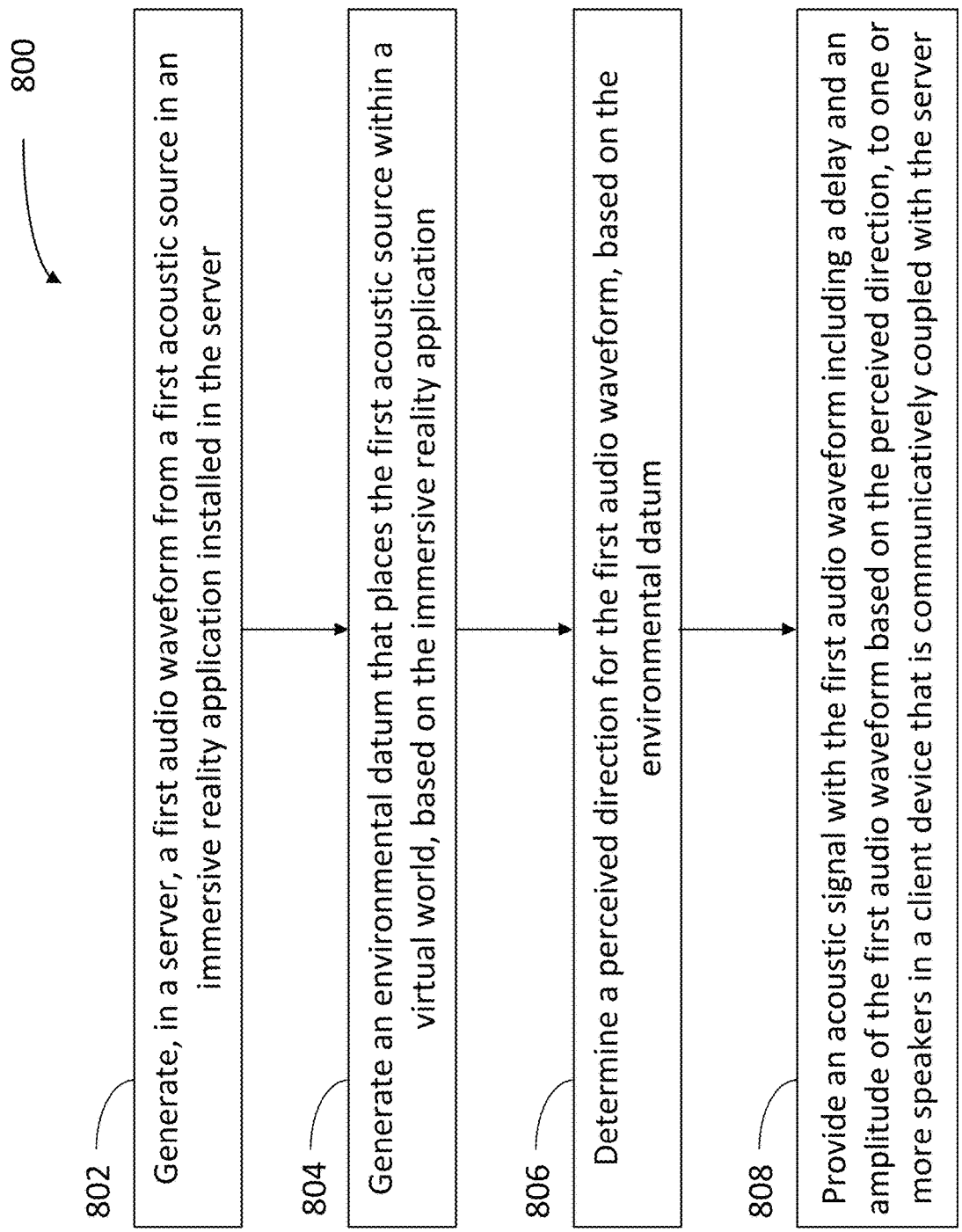
FIG. 8 is a flowchart illustrating steps in a method 800 for audio beam steering, tracking, and audio effects for an immersive reality application, according to some embodiments.

FIG. 8 is a flowchart illustrating steps in a method 800 for audio beam steering, tracking, and audio effects for an immersive reality application, according to some embodiments. In some embodiments, at least one or more of the steps in method 800 may be performed by a processor executing instructions stored in a memory in either one of a smart glass or other wearable device on a user's body part (e.g., head, arm, wrist, leg, ankle, finger, toe, knee, shoulder, chest, back, and the like). In some embodiments, at least one or more of the steps in method 800 may be performed by a processor executing instructions stored in a memory, wherein either the processor or the memory, or both, are part of a mobile device for the user, a remote server, or a database, communicatively coupled with each other via a network (e.g., processors 112 and 212, memories 220 120, mobile devices 110, 210, server 130, and network 150). Moreover, the mobile device, the smart glass, and the wearable devices may be communicatively coupled with each other via a wireless communication system and protocol (e.g., communications module 118 including a radio, Wi-Fi, Bluetooth, near-field communication—NFC— and the like). In some embodiments, a method consistent with the present disclosure may include one or more steps from method 800 performed in any order, simultaneously, quasi-simultaneously, or overlapping in time.

Step 802 includes generating, in a server, a first audio waveform from a first acoustic source in an immersive reality application installed in the server. In some embodiments, step 802 includes receiving the first audio waveform from a headset that is communicatively coupled with the server, wherein a user of the headset is a participant of the immersive reality application. In some embodiments, step 802 includes generating a second audio waveform from a second acoustic source in an immersive reality application installed in the server.

Step 804 includes generating an environmental datum that places the first acoustic source within a virtual world, based on the immersive reality application.

Step 806 includes determining a perceived direction for the first audio waveform, based on the environmental datum. In some embodiments, step 806 includes determining a perceived direction for the second audio waveform, based on a second environmental datum that places the second acoustic source within the virtual world.

Step 808 includes providing an acoustic signal with the first audio waveform including a delay and an amplitude of the first audio waveform based on the perceived direction, to one or more speakers in a client device that is communicatively coupled with the server. In some embodiments, the first acoustic source is a moving source, and step 808 includes adjusting a frequency of the first audio waveform based on a doppler effect induced by the moving source. In some embodiments, step 808 includes providing, to a display of the client device, an image of the first acoustic source. In some embodiments, step 808 includes inserting the second audio waveform in the acoustic signal with a delay and an amplitude based on the perceived direction for the second audio waveform.

Hardware Overview

Figure 9:
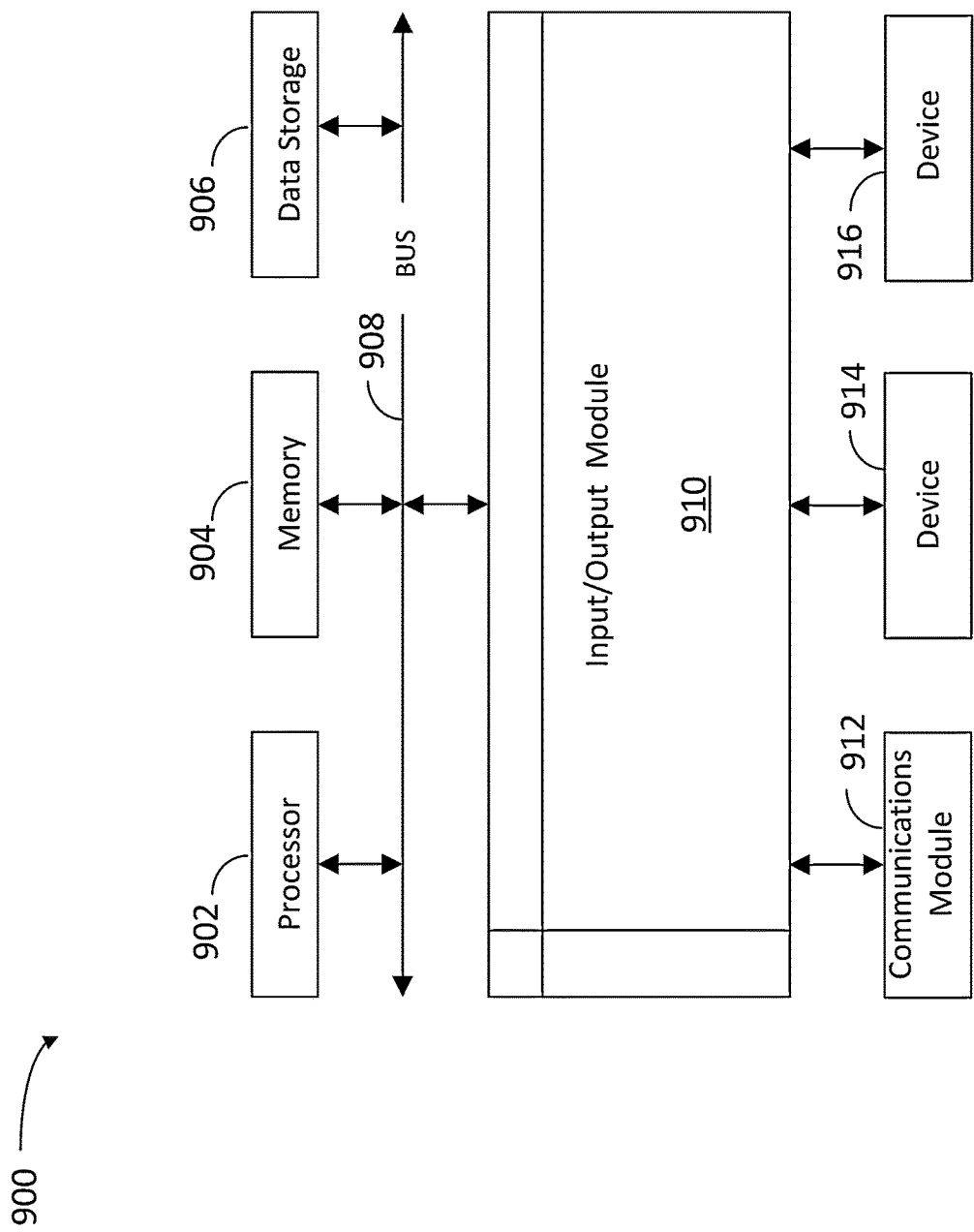
FIG. 9 is a block diagram illustrating a computer system for implementing a headset and methods for use thereof, according to some embodiments.

FIG. 9 is a block diagram illustrating a computer system for implementing a headset and methods for use thereof, according to some embodiments. In certain aspects, computer system 900 may be implemented using hardware or a combination of software and hardware, either in a dedicated server, or integrated into another entity, or distributed across multiple entities. Computer system 900 may include a desktop computer, a laptop computer, a tablet, a phablet, a smartphone, a feature phone, a server computer, or otherwise. A server computer may be located remotely in a data center or be stored locally.

Computer system 900 includes a bus 908 or other communication mechanism for communicating information, and a processor 902 (e.g., processor 112) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 120), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled with bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer-readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled with bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 include networking interface cards, such as Ethernet cards and modems. In certain aspects, input/output module 910 is configured to connect to a plurality of devices, such as an input device 914 and/or an output device 916. Exemplary input devices 914 include a keyboard and a pointing device, e.g., a mouse or a trackball, by which a consumer can provide input to the computer system 900. Other kinds of input devices 914 can be used to provide for interaction with a consumer as well, such as a tactile input device, visual input device, audio input device, or brain-computer interface device. For example, feedback provided to the consumer can be any form of sensory feedback, e.g., visual feedback, auditory feedback, or tactile feedback; and input from the consumer can be received in any form, including acoustic, speech, tactile, or brain wave input. Exemplary output devices 916 include display devices, such as an LCD (liquid crystal display) monitor, for displaying information to the consumer.

According to one aspect of the present disclosure, smart glass 100-1 can be implemented, at least partially, using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical consumer interface or a Web browser through which a consumer can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

In one aspect, a method may be an operation, an instruction, or a function and vice versa. In one aspect, a claim may be amended to include some or all of the words (e.g., instructions, operations, functions, or components) recited in other one or more claims, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be described, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described as such, one or more features from a described combination can in some cases be excised from the combination, and the described combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the described subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately described subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method, comprising:
    receiving, from an immersive reality application, a first audio waveform from a first acoustic source to provide to a user of a headset;
    identifying a direction of the first acoustic source relative to the headset based on a location of the first acoustic source;
    providing, to a first speaker in a client device, an audio signal including the first audio waveform, wherein the audio signal includes a time delay and an amplitude of the first audio waveform based on the direction of the first acoustic source;
    displaying a menu comprising multiple acoustic sources, including the first acoustic source;
    receiving a selection of at least one of the multiple acoustic sources; and
    providing, to the first speaker in the client device, an audio signal including an audio waveform associated with the selection.

2. The computer-implemented method of claim 1, wherein receiving the first audio waveform comprises receiving the location of the first acoustic source from the immersive reality application.

3. The computer-implemented method of claim 1, further comprising receiving, from the immersive reality application, a second audio waveform from a second acoustic source, identifying a second direction of the second acoustic source based on a location of the second acoustic source, and inserting the second audio waveform in the audio signal with a time delay and an amplitude based on the second direction of the second acoustic source.

4. The computer-implemented method of claim 1, wherein the immersive reality application is a podcast and the first acoustic source includes a first participant of the podcast, further comprising providing a second audio signal from the user of the headset as a second participant of the podcast in a second direction indicative of a relative position between the first participant and the second participant, within the podcast.

5. The computer-implemented method of claim 1, wherein receiving the first audio waveform from the first acoustic source comprises receiving multiple audio waveforms from the multiple acoustic sources, and providing the audio signal to the first speaker in the client device comprises inserting each of the audio waveforms with a time delay and an amplitude based on multiple directions associated with a location for each of the acoustic sources provided by the immersive reality application.

6. The computer-implemented method of claim 1, wherein the first acoustic source is a caller in communication with the user of the headset, and identifying the direction for the first acoustic source comprises placing the caller in a selected virtual position relative to the user of the headset.

7. The computer-implemented method of claim 1, wherein: the immersive reality application includes a capture of an event attended by the user of the headset, the first acoustic source is a second user of a second headset, the first audio waveform is provided by the second headset, and identifying the direction for the first acoustic source comprises placing the second user in a selected location within the event.

8. The computer-implemented method of claim 1, wherein the client device is the headset, further comprising providing the audio signal to a second speaker in the headset, based on the direction of the first acoustic source.

9. The computer-implemented method of claim 1, wherein the client device is a stereo system including at least two speakers and communicatively coupled to the headset via a network, further comprising providing the audio signal to a second speaker in the stereo system, based on the direction of the first acoustic source.

10. The computer-implemented method of claim 1, wherein the headset comprises a display in at least one eyepiece, further comprising providing an image on the display of the first acoustic source for the user of the headset that is consistent with the location of the first acoustic source.

11. A headset, comprising:
- a processor configured to receive, from an immersive reality application, a first audio waveform from a first acoustic source in a first location;
- a left speaker, configured to provide the first audio waveform to a left ear of a headset user;
- a right speaker, configured to provide the first audio waveform to a right ear of the headset user, wherein the processor is configured to adjust a time delay of the first audio waveform between the left speaker and the right speaker, and to modulate an amplitude of the first audio waveform in the left speaker and the right speaker based on the first location of the first acoustic source; and
- a display, configured to present a menu comprising multiple acoustic sources, including the first acoustic source, wherein the processor is configured to provide to the left speaker or the right speaker an audio signal including an audio waveform associated with an acoustic source selected from the menu.

12. The headset of claim 11, wherein the first acoustic source is a second user of a second headset, further comprising determining a relative location of the headset user and the second user according to the immersive reality application.

13. The headset of claim 11, wherein the processor is configured to provide, to the headset user, an image of the first acoustic source to the display, according to an environment provided by the immersive reality application.

14. The headset of claim 11, wherein the first acoustic source is a second user of a second headset, further comprising a processor configured to transmit, to a client device, an image of the second user and the headset user according to an environment provided by the immersive reality application.

15. The headset of claim 11, further comprising a memory storing instructions which, when executed by the processor, cause the headset to perform operations for the immersive reality application.

16. A computer-implemented method, comprising:
- generating, in a server, a first audio waveform from a first acoustic source in an immersive reality application installed in the server;
- generating an environmental datum that places the first acoustic source within a virtual world, based on the immersive reality application;
- determining a direction of the first audio waveform, based on the environmental datum;
- providing an acoustic signal with the first audio waveform including a delay and an amplitude of the first audio waveform based on the direction of the first audio waveform, to one or more speakers in a client device that is communicatively coupled with the server;
- displaying a menu comprising multiple acoustic sources, including the first acoustic source; and
- providing an audio waveform associated with an acoustic source selected from the menu.

17. The computer-implemented method of claim 16, wherein generating the first audio waveform comprises receiving the first audio waveform from a headset that is communicatively coupled with the server, wherein a user of the headset is a participant of the immersive reality application.

18. The computer-implemented method of claim 16, wherein the first acoustic source is a moving source, and providing the acoustic signal with the first audio waveform comprises adjusting a frequency of the first audio waveform based on a doppler effect induced by the moving source.

19. The computer-implemented method of claim 16, further comprising providing, to a display of the client device, an image of the first acoustic source.

20. The computer-implemented method of claim 16, further comprising:
- generating a second audio waveform from a second acoustic source in the immersive reality application installed in the server;
- determining a direction of the second audio waveform, based on a second environmental datum that places the second acoustic source within the virtual world; and
- inserting the second audio waveform in the acoustic signal with a delay and an amplitude based on the direction of the second audio waveform.

* * * * *